(12) United States Patent
TeNgaio et al.

(10) Patent No.: US 7,971,049 B2
(45) Date of Patent: Jun. 28, 2011

(54) SYSTEMS AND METHODS FOR MANAGING USER CONFIGURATION SETTINGS

(75) Inventors: Lance TeNgaio, Pleasant Grove, UT (US); Jeremy Hurren, Pleasant Grove, UT (US)

(73) Assignee: Symantec Corporation, Mountain View, CA (US)

( * ) Notice: Subject to any disclaimer, the term of this patent is extended or adjusted under 35 U.S.C. 154(b) by 619 days.

(21) Appl. No.: 12/060,244

(22) Filed: Mar. 31, 2008

(65) Prior Publication Data

US 2009/0249051 A1 Oct. 1, 2009

(51) Int. Cl.
*G06F 9/00* (2006.01)
*G06F 9/24* (2006.01)
*G06F 15/177* (2006.01)
*G06F 1/24* (2006.01)

(52) U.S. Cl. .......................... 713/1; 713/100
(58) Field of Classification Search .............. 713/1, 100; 710/104; 717/121
See application file for complete search history.

(56) References Cited

U.S. PATENT DOCUMENTS

| | | | |
|---|---|---|---|
| 6,728,877 B2 | 4/2004 | Mackin et al. | |
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 2003/0221094 A1* | 11/2003 | Pennarun | 713/1 |
| 2004/0139309 A1* | 7/2004 | Gentil et al. | 713/1 |
| 2004/0267971 A1* | 12/2004 | Seshadri | 710/8 |
| 2008/0086719 A1* | 4/2008 | Clemenceau et al. | 717/121 |
| 2008/0244028 A1* | 10/2008 | Le et al. | 709/208 |

OTHER PUBLICATIONS

Altiris® Software Virtualization Solution™ 2.1 Reference, Jun. 14, 2007 (160 pages).
Altiris® PC Transplant® Professional Edition 6.8 Help, Feb. 2, 2007 (115 pages).
Altiris® PC Transplant® Professional Edition 6.8 Reference Guide, Feb. 2, 2007 (143 pages).
Altiris® Software Virtualization Solution™ 2.0 White Paper, Jan. 31, 2006 (19 pages).
Craig Marl, *User Data and Settings Management*, Microsoft TechNet, Jul. 23, 2003, Microsoft Corporation (26 pages).

* cited by examiner

*Primary Examiner* — Thomas Lee
*Assistant Examiner* — Brandon Kinsey
(74) *Attorney, Agent, or Firm* — Advantedge Law Group

(57) ABSTRACT

A computer system may include a virtual configuration settings package that captures a user's configuration settings in a user layer. The user layer may represent the files, registry entries, and the like, that make up the virtualized configuration settings. The configuration settings may be captured by filtering file system requests through a virtualization driver. The file system requests that are associated with the user's configuration settings may be redirected to the user layer. Virtualizing the configuration settings may make them much simpler to manage. The virtual configuration settings package may be selectively activated or deactivated, imported and exported, reset, deleted, and so forth. The user layer may include configuration settings from the operating system, applications, and the like.

20 Claims, 16 Drawing Sheets

SYSTEMS AND METHODS FOR MANAGING USER CONFIGURATION SETTINGS

BACKGROUND

Today's computers include large numbers of configuration settings that can be customized by a user or a network administrator. These settings can be used to alter the appearance and functionality of the operating system, applications, and other software. Using the Windows operating system as an example, some of the configuration settings include desktop settings (including control panel settings), network settings, file system folder settings, application specific settings, Internet settings, and so forth.

Managing user settings is a formidable task. Part of the problem is due to the sheer number of settings on a computer. However, an even bigger part of the problem is that the settings are largely unorganized. Computers running the Windows family of operating systems may have settings stored in the registry or in any of a number of files. For example, the operating system may store some settings in various places in the registry and store other settings in multiple files in various locations. Applications suffer from the same problem. The end result is that configuration settings are dispersed all over the computer in a way that makes them difficult to collect and manage.

Another problem that adds to the complexity is that there is no easy way to collect and store configuration settings that have different formats. The operating system and applications typically use unique data layouts and data storage features that do not allow for homogenous collection and storage.

All of this combined makes it very difficult for a user or network administrator to migrate a user's settings to another computer, restore a user's settings after a system failure, restore a user's settings after an application has become corrupted, and the like. Ultimately, the choice has to be made to either manually reconfigure the operating system and/or applications or to spend hours of hands-on time trying to capture and/or implement the old settings. For this reason, many users and network administrators are very hesitant to reinstall software to correct problems. They would rather live with the problem than be forced to reconfigure all of the settings again.

Another situation when user settings can be challenging to manage occurs when virtualized applications are installed on the computer. Virtualized applications improve application compatibility and manageability by encapsulating applications from the underlying operating system on which they are executed. A virtualized application is not installed in the traditional sense, although it is still executed as if it is.

When a virtualized application is launched, the virtualization layer intercepts and transparently redirects operations such as file input/output by the application. The virtualized application believes it has direct access to the underlying operating system resources, although in effect it does not, because its operations are transparently redirected elsewhere. Virtualized applications are commonly paired with application streaming to deliver applications on demand.

When an application is virtualized, the application and/or data sets associated with the application are deployed on the operating system in a virtual package. The virtual package contains all of the files, processes, and settings required to successfully run the application. The virtual package is like a layer over the base operating system so that the system appears to contain the aggregate contents of the base operating system plus the active virtual packages.

An application virtualization software (sometimes referred to herein as a virtualization application) is used to capture all of the files, registry settings, etc. into the virtual package as the application is installed. Because the application, its settings, files, and data are contained in the virtual package, the application can be instantly activated, deactivated, or reset. Also, this prevents conflicts between applications without altering the base installation.

Some examples of application virtualization software can be found in the following U.S. patents: (1) U.S. Pat. No. 7,162,724, entitled "Layered Computing Systems and Methods," issued on 9 Jan. 2007, (2) U.S. Pat. No. 7,165,260, entitled "Layered Computing Systems and Methods for Insecure Environments," issued on 16 Jan. 2007, and (3) U.S. Pat. No. 7,117,495, entitled "Systems and Methods for the Creation of Software Packages Using Layered Systems," issued on 3 Oct. 2006, all of which are incorporated herein by reference in their entirety. In the event of a conflict, the subject matter explicitly recited or shown herein controls over any subject matter incorporated by reference. All express or implied definitions of a term contained in any of the subject matter incorporated by reference herein are hereby disclaimed.

One of the advantages of virtualized applications is that they can be instantly reset back to their original installed configuration. This is useful when an application is poorly written and causes adverse effects on the system. Although this is a powerful tool, resetting an application, unfortunately, resets all of the user's settings for that application. For this reason, many users and network administrators are reluctant to reset applications.

Accordingly, it would be desirable to provide an improved system and method to manage user configuration settings that overcome one or more of these problems.

SUMMARY

A number of embodiments of a system and method for managing configuration settings are described herein. In one embodiment, a user's configuration settings are virtualized so that it is simple and easy to manage them. In certain embodiments, a virtual configuration settings package is used to capture a user's configuration settings in a user layer. The user layer represents the files, registry entries, and the like, that make up the user's virtualized configuration settings. The user layer may include configuration settings for the operating system (e.g., Windows, Linux, and so forth), applications (e.g., MS Office, Adobe Acrobat, and so forth), web sites (e.g., cookies), and so forth. A user layer may be created for every user that uses a particular computer. Whenever a user logs onto the system, that user's configuration settings are applied to the operating system, applications, and the like.

The user's configuration settings may be captured in the user layer using a virtualization driver. The virtualization driver may be logically located between the input/output (I/O) subsystem and the file system (e.g., the File Allocation Table (FAT), New Technology File System (NTFS), Windows Future Storage (WinFS) system, or the like). From this vantage point, the virtualization driver sees every file system request that comes through the computer's I/O subsystem. Any requests that are associated with configuration settings are intercepted and redirected to the virtual configuration settings package.

In one embodiment, the user layer may include one or more sublayers. For example, the user layer may include a read-only sublayer and a writable sublayer. The read-only sublayer may represent the user's configuration settings at an earlier state. The writable sublayer may represent the user's configuration settings at the present time. If a configuration setting is changed that causes problems with the computer system, the user layer can be easily reset back to the read-only sublayer. In one embodiment, the read-only sublayer may include the default configuration settings of the computer system (e.g., operating system, applications, and the like) before the user makes any changes. In another embodiment, the read-only sublayer may be capable of being updated periodically to allow the user to capture the state of the computer system after the user has made a number of changes. The updated read-only sublayer may be used as the reset state of the computer system.

Managing the user's configuration settings is simple because the settings are all included in the user layer. In one embodiment, the user layer can be instantly activated and deactivated. When the user layer is activated, the user layer is made visible so that the configuration settings represented by the user layer are applied to the computer system. When the user layer is deactivated, the user layer is hidden so that the configuration settings are not applied to the computer system.

The virtualization driver may be used to activate and deactivate the user layer. When the user layer is activated, the virtualization driver is actively filtering file system requests and redirecting the requests to the virtual configuration settings package. When the user layer is deactivated, the virtualization driver stops filtering and redirecting file system requests. In this situation, the existence of the user layer is obscured from the operating system, applications, and so forth. Therefore, the user layer can be activated and deactivated by enabling and disabling the virtualization driver—a change that takes place almost instantaneously.

The user layer may also be exported and loaded onto other computer systems. In one embodiment, the user layer may be processed to form a file that is compatible with other computer systems that may have a different folder structure. The folder structure of each system may make a difference if the paths to the files and registry entries are not the same (i.e., the user changed the location of some of the folders on one of the systems, but not the other one). In one embodiment, the configuration settings in the user layer are variablized to make them compatible with other computer systems that have different file structures.

In certain embodiments, the user layer may include application specific sublayers. For example, the user layer may include a read-only sublayer and a writable sublayer for one application, another read-only sublayer and a writable sublayer for another application, and a general read-only sublayer and a general writable sublayer. This allows the user to maintain different default settings (i.e., the read-only sublayers) for different applications. Also, the user can reset a single application to the configuration settings stored in the application specific read-only sublayer rather than resetting all of the applications.

In some embodiments, the user layer may be deployed by itself on a computer system. In other embodiments, the user layer may be implemented in combination with one or more virtualized applications that are contained in one or more application layers. The virtualization application that is used to virtualize the configuration settings may also be used to virtualize the applications. In one embodiment, the user layer may include the configuration settings for the operating system as well as for all of the application layers. In another embodiment, the user layer may include configuration settings for the operating system and for the virtualized applications. However, if a virtualized application has an application configuration settings sublayer, then it controls over the user layer configuration settings. In yet another embodiment, each of the application sublayers may include an application configuration settings sublayer. Therefore, the user layer does not include any configuration settings for these applications. The user layer includes the operating system configuration settings and configuration settings for applications that have not been virtualized.

The user layer may also be implemented in a network environment. In one embodiment, a user layer is created when a user logs on to a client computer. The virtualization application may be configured to maintain a list of installed or activated applications (if some of the applications are virtualized) on the client computer. The client computer may query a configuration settings repository to obtain the user's configuration settings for the installed or activated applications, operating system, and the like. The client computer may receive the configuration settings and load them into the user layer. In one embodiment, the configuration settings may be imported into the user layer and immediately activated. When the user logs off, the configuration settings may be transferred back to the configuration settings repository, which is typically located on a server. This implementation allows the user the ability to use different client computers but still have each one customized how the user likes it.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
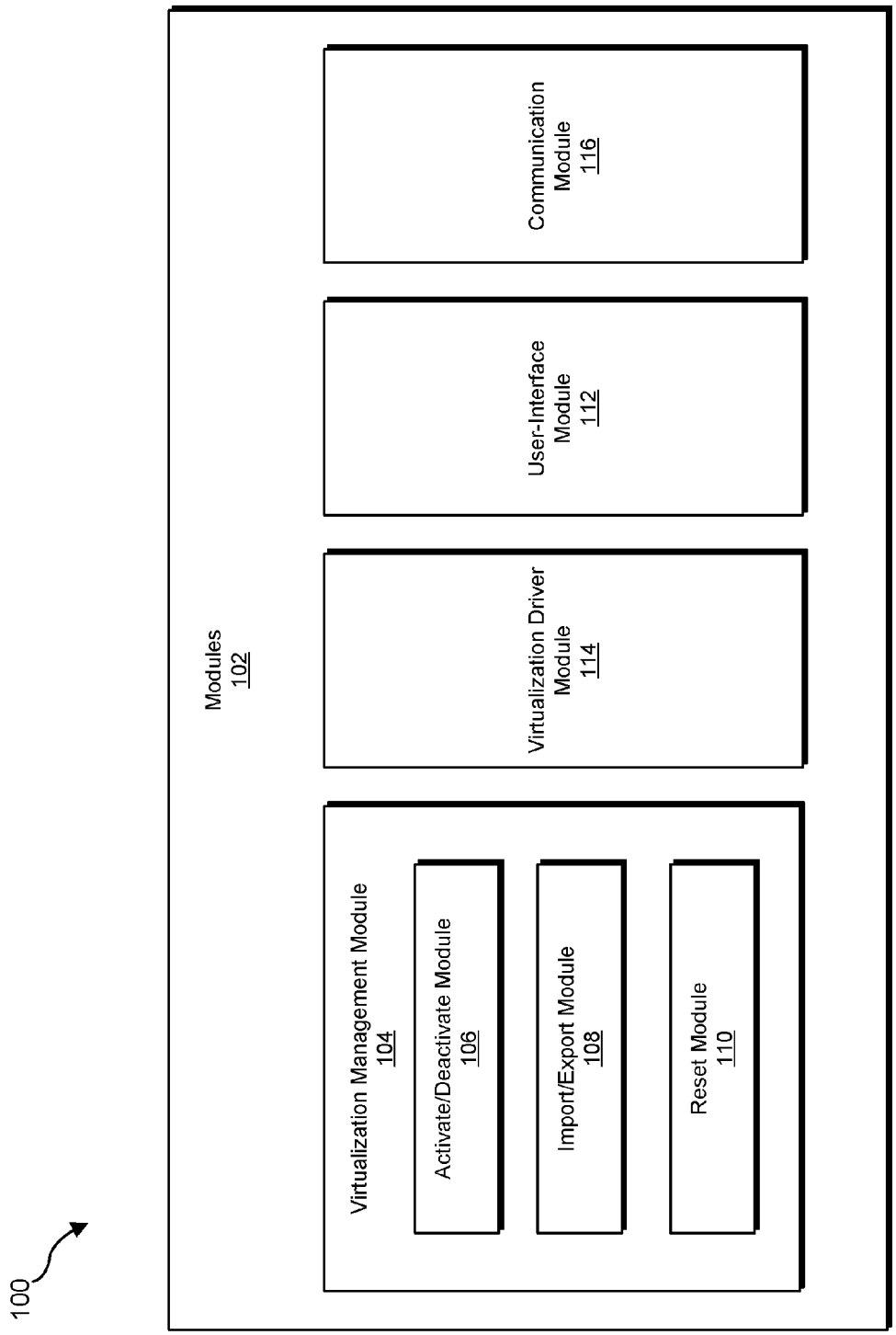
FIG. 1 is a block diagram of an exemplary system for virtualizing configuration settings according to one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As described in greater detail below, the instant disclosure generally relates to systems and methods for managing user configuration settings. In one embodiment, a user's configuration settings are virtualized to make them much simpler and easier to manage. In certain embodiments, a virtual configuration settings package is used to capture a user's configuration settings in a user layer. The user layer represents the files, registry entries, and the like, that make up the user's virtualized configuration settings.

The user layer may be used with any suitable hardware and/or software configuration. For example, the user layer may be deployed on computer systems running Windows, Linux, or a host of other operating systems. The user layer may be used to capture configuration settings from the operating system as well as from applications such as MS Office, Adobe Acrobat, Internet Explorer, Firefox, and so forth. A user layer may be created for every user that uses a particular computer. Whenever a user logs onto the system, that user's configuration settings may be applied to the operating system, applications, and the like. The ability to use a user layer to store configuration settings could be specified to service all users, specific users, and/or groups of users.

The following will provide, with reference to FIGS. 1-2, 4-8, 10, and 13, detailed descriptions of exemplary systems for: 1) virtualizing configuration settings, 2) filtering and redirecting file system requests to capture configuration settings in the virtual configuration settings package, and 3) managing the configuration settings data. Detailed descriptions of corresponding exemplary computer-implemented methods will also be provided in connection with FIGS. 3, 9, 11-12, and 14.

FIG. 1 is a block diagram of an exemplary system 100 for virtualizing configuration settings. As illustrated in this figure, exemplary system 100 may comprise one or more modules 102 for performing one or more tasks. For example, exemplary system 100 may comprise a virtualization management module 104 for managing the virtualized configuration settings. The virtualization management module 104 may include additional modules that perform one or more tasks. For example, as shown in FIG. 1, the virtualization management module 104 may include an activate/deactivate module 106 for selectively activating and deactivating the user layer, an import/export module 108 that may facilitate importing and exporting the user's configuration settings to other computer systems, and a reset module 110 for resetting the user layer to a previous or default state.

Exemplary system 100 may also comprise a virtualization driver module 106 for monitoring file system requests and redirecting those requests that are related to configuration settings to a virtual configuration settings package. The system 100 may also comprise a communication module 116 for facilitating communication between a computing system (such as a user's system) and a server or backend and a user-interface module 112 for providing a user interface.

In certain embodiments, one or more of modules 102 may represent one or more software applications or programs that, when executed by a computing device, may cause the computing device to perform one or more tasks required to virtualize the user's configuration settings, manage the virtualized configuration settings, and so forth. For example, as will be described in greater detail below, one or more of modules 102 may represent software modules configured to run on one or more computing devices, such as client 902 in FIG. 13, server 910 in FIG. 13, computing system 1010 in FIG. 15, and/or portions of exemplary network architecture 1100 in FIG. 16. One or more of modules 102 may also represent all or portions of one or more special-purpose computers configured to perform one or more of the tasks described herein.

The virtualization management module 104 and the virtualization driver module 114 may be combined together as part of a single virtualization application. The virtualization application may be the underlying software that is used to virtualize the configuration settings. In some embodiments, the virtualization application may be used to virtualize applications as well.

Figure 5:
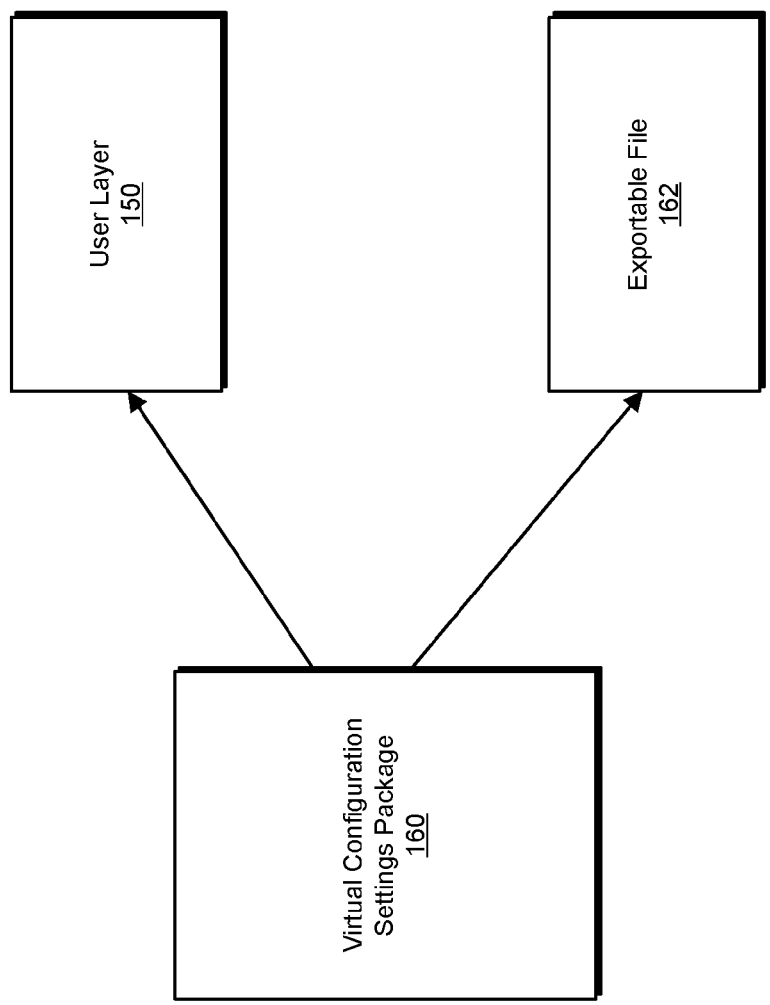
FIG. 5 is a block diagram of an exemplary virtual configuration settings package that has two formats: a user layer or an exportable file that contains the user's configuration settings.

Referring to FIG. 5, the virtual configuration settings package 160 may be manifested in one of two formats: (1) a user layer 150 or (2) an exportable file 162. Both the user layer 150 and the exportable file 162 may represent all of the files, registry entries, etc., that make up the virtualized configuration settings package 160. In one example, the difference between the two formats is that the configuration settings in the exportable file 162 may be variablized while the configuration settings in the user layer 150 may not be variablized. The exportable file 162 may be variablized to account for the different environment settings of different computer systems. For example, the source computer system may have a different file structure than the target computer system. In order to make the exportable file 162 compatible with the target computer system, the file may be variablized.

In one embodiment, the exportable file 162 may be variablized by substituting common system variables for well-known locations on a Windows installation, such as WINDIR as a substitute for the "Windows" folder. This may provide seamless compatibility with systems that may not be using the standard folder structure, such as systems where the "My Documents" folder has been moved or the OS folders have been renamed.

Figure 4:
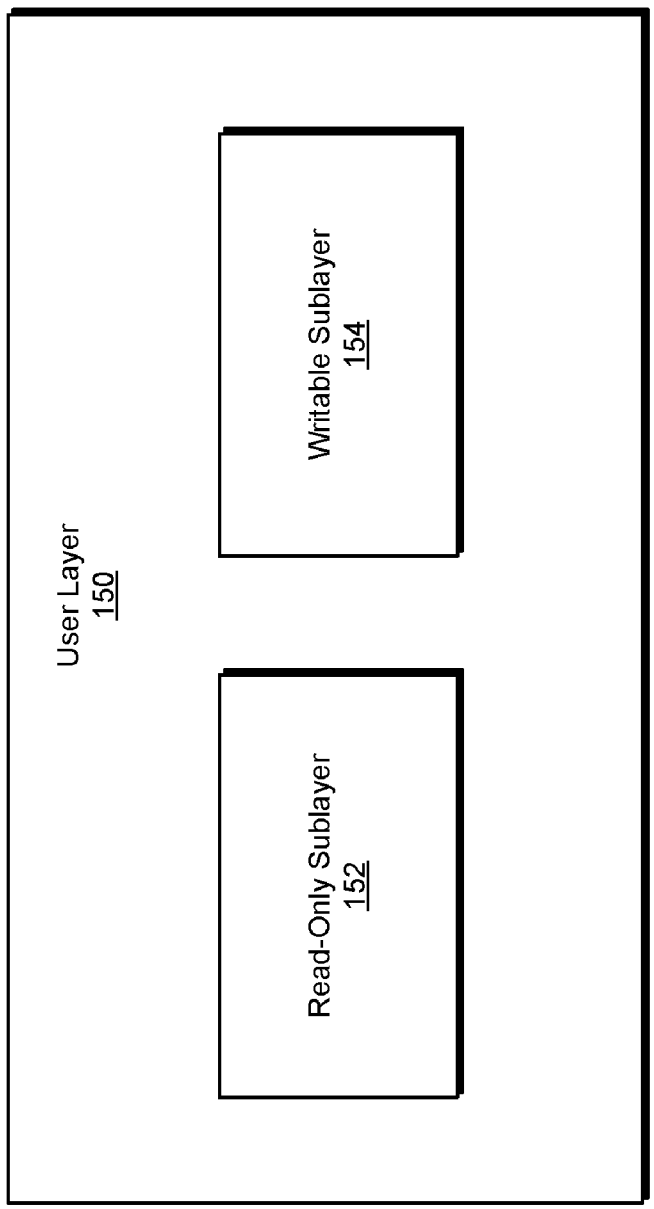
FIG. 4 is a block diagram of an exemplary user layer having a read-only sublayer and a writable sublayer.

Turning now to FIG. 4, one embodiment of the user layer 150 is shown. In this embodiment, the user layer 150 may include a read-only sublayer 152 and a writable sublayer 154. The read-only sublayer 152 may represent the user's configuration settings at an earlier state or in a default state. In one embodiment, the read-only sublayer 152 may include those configuration settings that were initially captured when the user layer 150 was first created.

The writable sublayer 154 may represent the user's configuration settings at the present time. The writable sublayer 154 may include those changes that have been made since the user layer 150 was first created. If a configuration setting is changed that causes problems with the computer system, the user layer 150 may be easily reset back to the configuration settings included in the read-only sublayer 152.

In one embodiment, the read-only sublayer 152 may be capable of being updated periodically. This allows the user to change the configuration settings on the computer system and then store them in the read-only sublayer 152. If problems arise in the future, the user can revert back to the user's default settings instead of the computer system's default settings.

Figure 2:
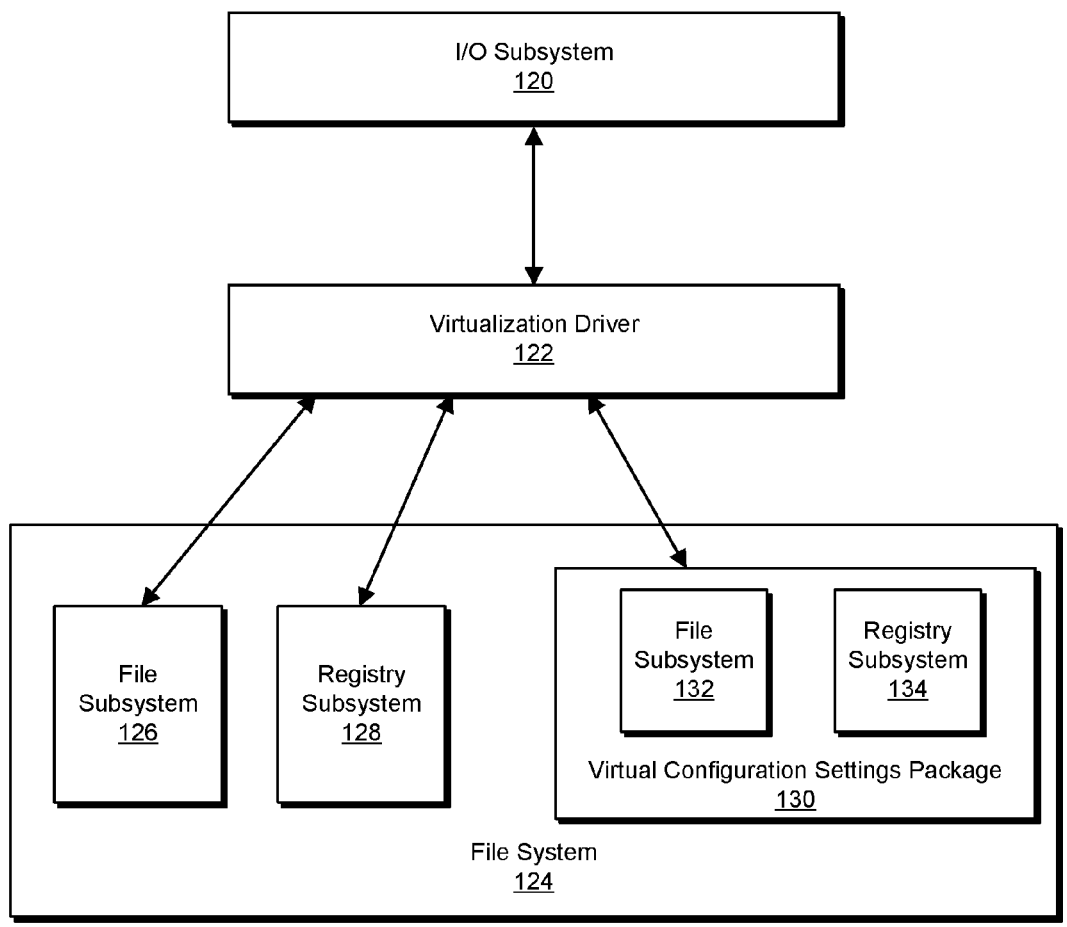
FIG. 2 is a block diagram of an exemplary system for filtering file system requests and redirecting file system requests related to configuration settings to a virtual configuration settings package.

Referring to FIG. 2, the logical relationship between the virtualization driver 122 and the computer system is illustrated. The virtualization driver 122 may be logically positioned between the input/output (I/O) subsystem 120 and the file system 124 (e.g., the File Allocation Table (FAT), New Technology File System (NTFS), Windows Future Storage (WinFS) system, or the like).

From this vantage point, the virtualization driver 122 can monitor every file system request that comes through the I/O subsystem 120. Any requests that are associated with configuration settings may be intercepted and redirected to a virtual configuration settings package 130. The virtual configuration settings package 130 may be similar to the virtual configuration settings package 160.

File system requests related to a registry entry that is associated with the user's configuration settings may be redirected to the registry subsystem 134 of the virtual configuration settings package 130. File system requests that are associated with the user's configuration settings may be redirected to the file subsystem 132 of the virtual configuration settings package 130. File system requests that are not redirected by the virtualization driver 122 may continue on normally to the file subsystem 126 or the registry subsystem 128 of the file system 124.

In certain embodiments, the physical location of the registry subsystem 134 may be in the Windows registry. For example, all of the redirected registry entries may be located in the registry at HKEY_LOCAL_MACHINE\System\Vendor\Fsl. The physical location of the file subsystem 132 may be, for example, a folder on the system root (e.g., C drive\Fsldr).

Figure 3:
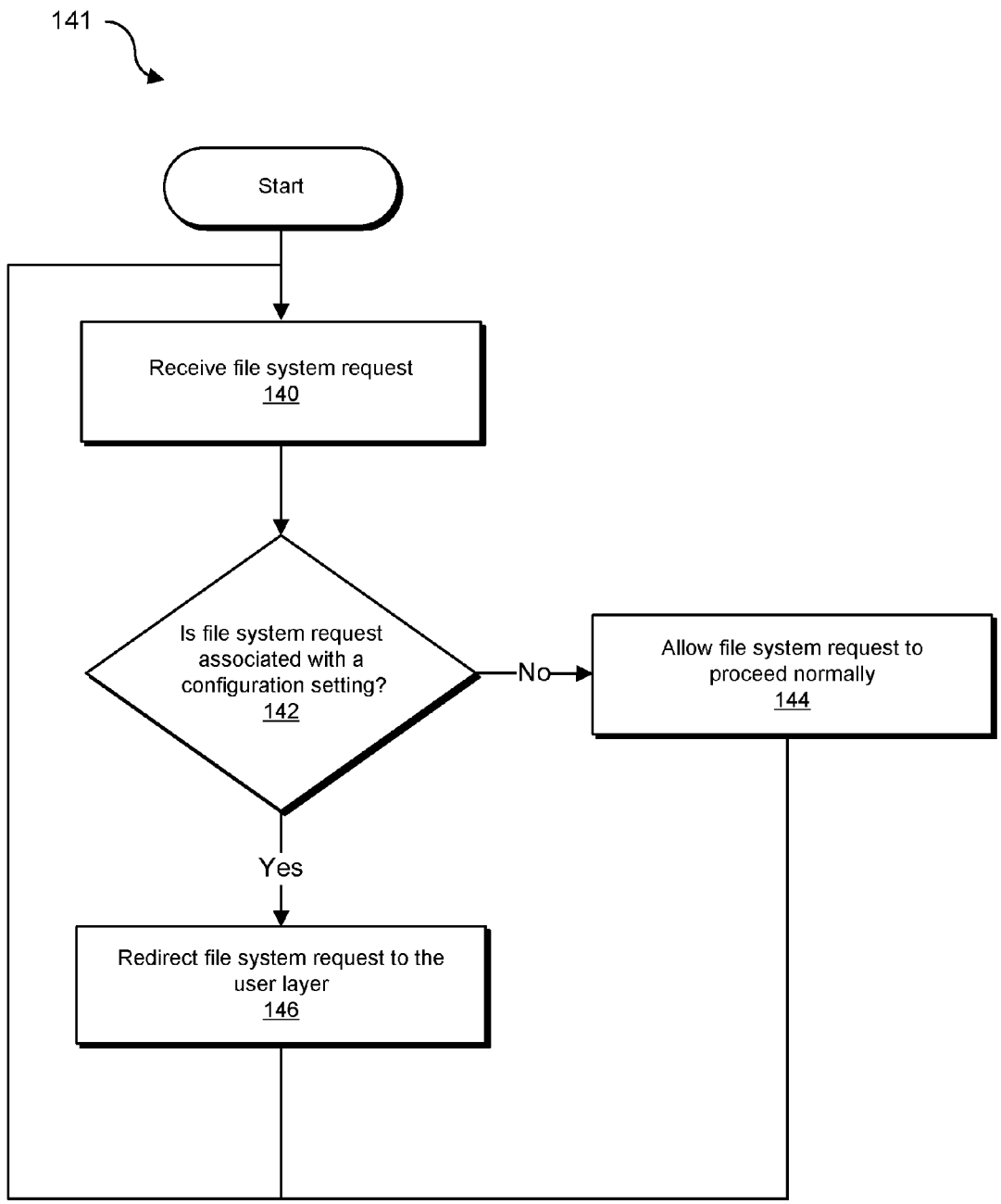
FIG. 3 is a flow diagram of an exemplary computer-implemented method of filtering and redirecting file system requests.

FIG. 3 is a flow diagram of an exemplary computer-implemented method 300 for determining whether a file system request should be redirected to the virtual configuration settings package 103 or allowed to continue on to the file system 124. At step 140, the virtualization driver 122 receives a file system request. At step 142, the virtualization driver 122 determines whether the file system request is associated with a configuration setting (e.g., an operating system configuration setting, an application configuration setting, or the like). If the file system request is associated with a configuration setting, it may be redirected to the user layer 150 in step 146.

If the file system request is not associated with a configuration setting, the file system request may be allowed to proceed to the file system 124.

Figure 6:
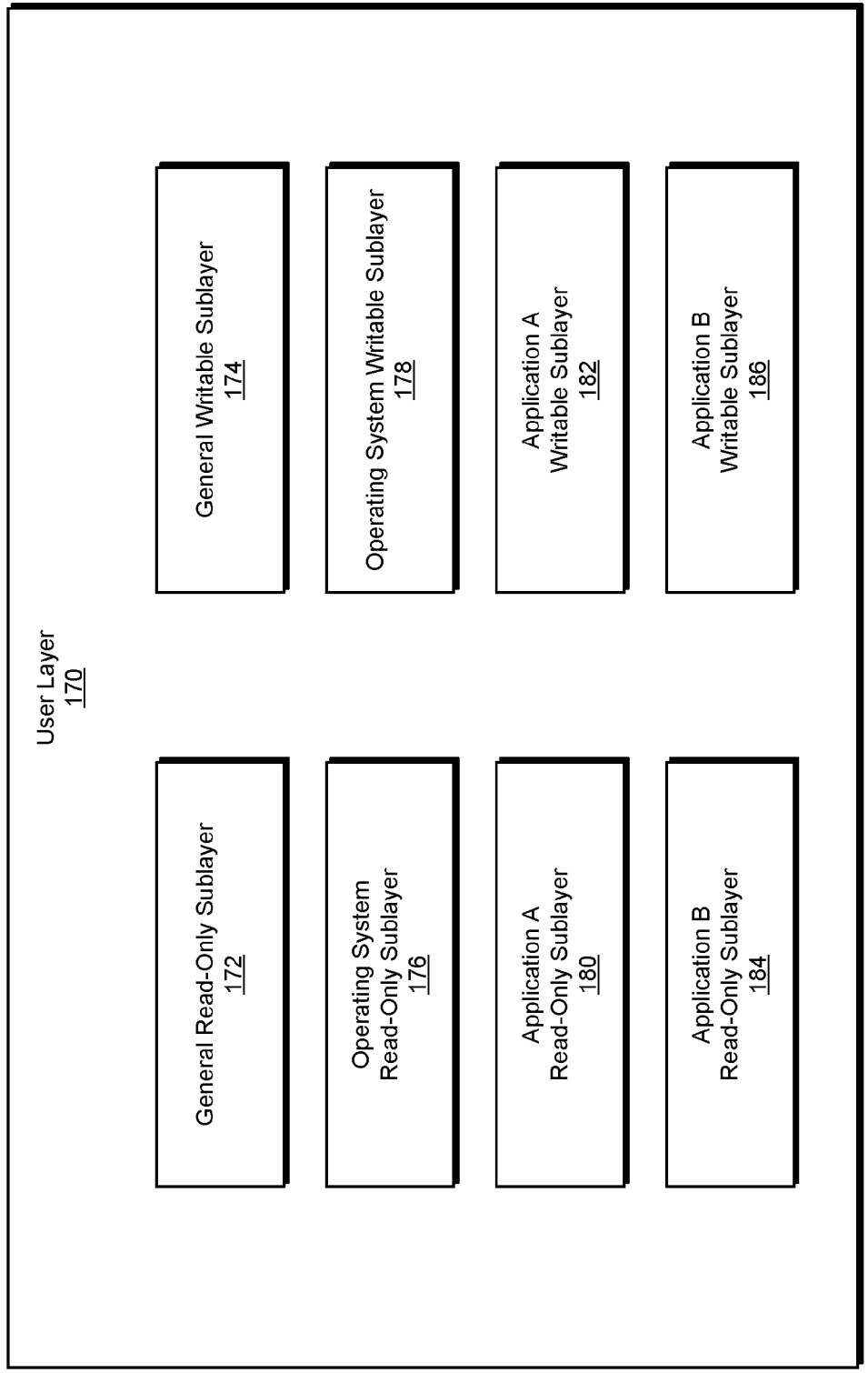
FIG. 6 is a block diagram of an exemplary user layer having general read-only and writable layers as well as application specific read-only and writable sublayers.

FIG. 6 shows a block diagram of another embodiment of a user layer 170. This user layer may be similar in many ways to the user layer 150 except that this user layer 170 includes additional sublayers. In this embodiment, the user layer 170 includes read-only and writable sublayers for the operating system (i.e., sublayers 176, 178), Application A (i.e., sublayers 180, 182), Application B (i.e., sublayers 184, 186), and for other miscellaneous configuration settings (i.e., sublayers 172, 174).

Splitting the configuration settings for the operating system, Application A, and Application B into separate sublayers may allow each component to be reset back to the read-only values without affecting the configuration settings of the other components. This may allow the user to reset configuration settings on an application-by-application basis.

Figure 7:
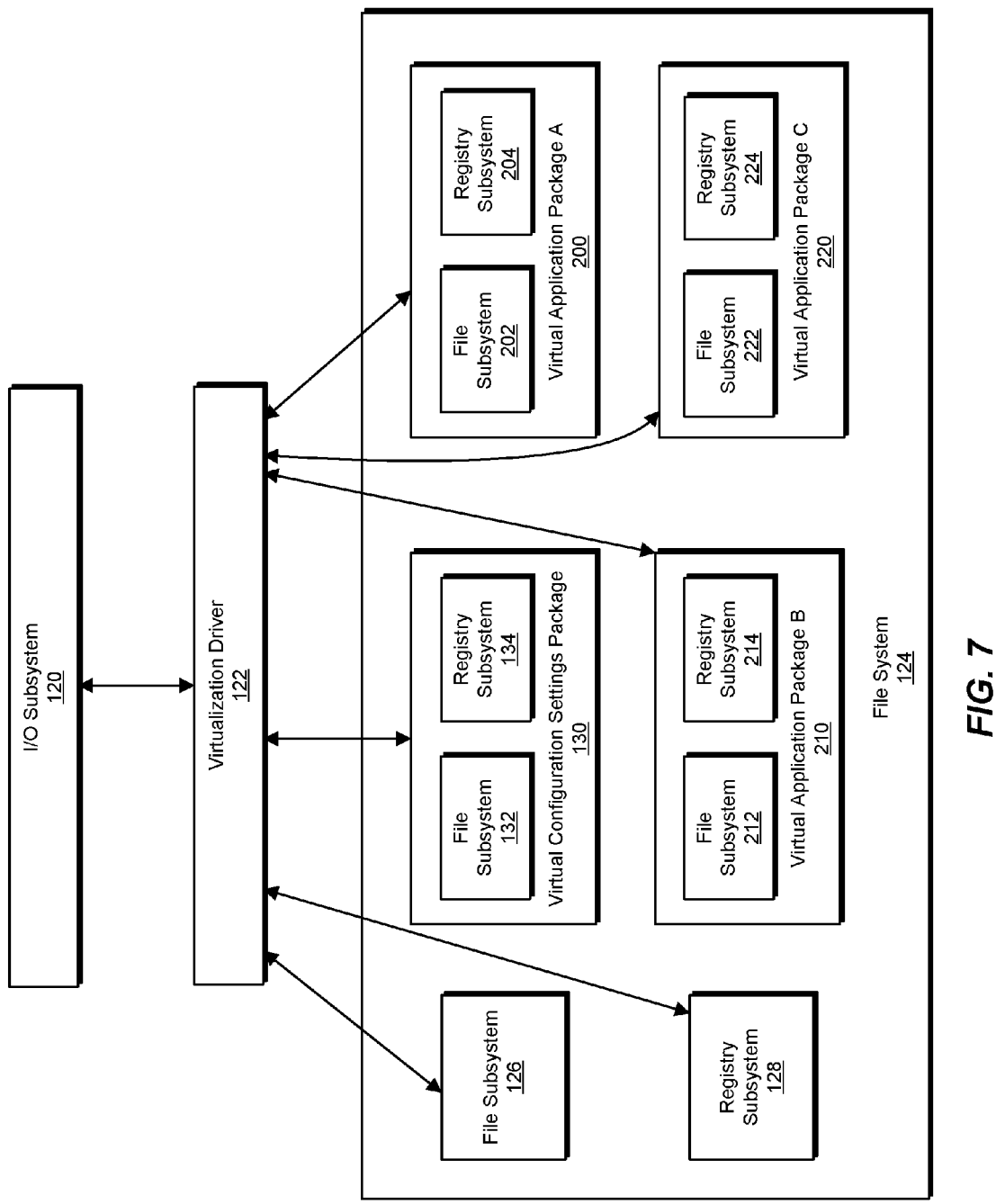
FIG. 7 is a block diagram of an exemplary system for filtering file system requests and redirecting file system requests between the virtual configuration settings package and multiple virtual application packages.

Turning now to FIG. 7, another embodiment is shown of a system for intercepting and redirecting file system requests. This embodiment is similar to the one shown in FIG. 2 except that this system includes three virtualized applications contained in virtual application package A 200 with its associated file subsystem 202 and registry subsystem 204, virtual application package B 210 with its associated file subsystem 212 and registry subsystem 214, and virtual application package C 220 with its associated file subsystem 222 and registry subsystem 224. The virtualization driver 122 may be configured to intercept file system requests and redirect them between the different virtual packages 130, 200, 210, 220. In one embodiment, the same virtualization application may be used to virtualize the configuration settings and the applications A, B, and C.

Figure 8:
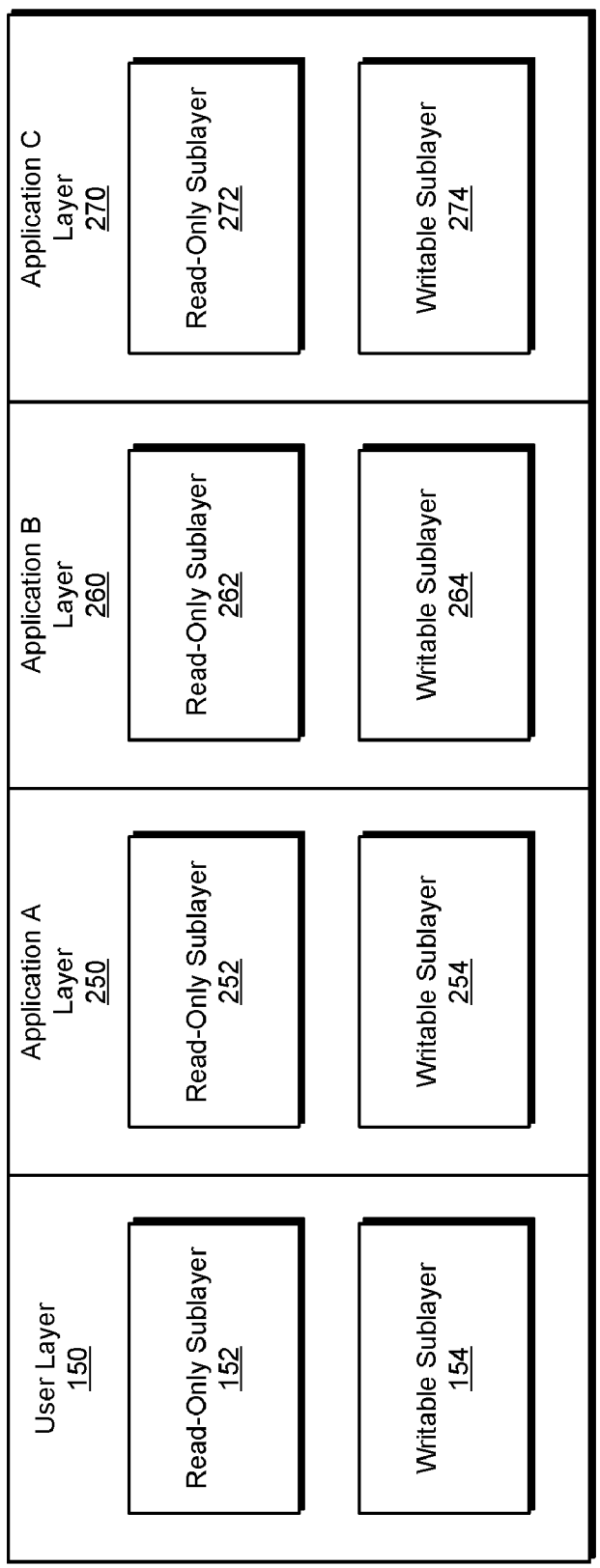
FIG. 8 is a block diagram of an exemplary system that includes a user layer and three application layers. The user layer in this system contains the configuration settings for the virtualized applications.

FIG. 8 shows the user layer 150 and the application layers 250, 260, and 270 that represent the content of each one of the virtual packages 130, 200, 210, 220, respectively. As shown, each application layer 250, 260, 270 may include a read-only sublayer 252, 262, 272 and a writable sublayer 254, 264, 274, respectively. The read-only sublayers 252, 262, 272 may be provided to include the data, files, etc. of each application at the time it was first captured in the application layer or at the last time the read-only sublayers were updated. The writable sublayers 254, 264, 274 may include the data, files, etc. that reflect the current state of the computer system.

In the embodiment shown in FIG. 8, all of the configuration settings may be included in the user layer 150. Thus, all or substantially all, of the configuration settings for the operating system, application A, application B, and application C may be included in the user layer 150.

Figure 9:
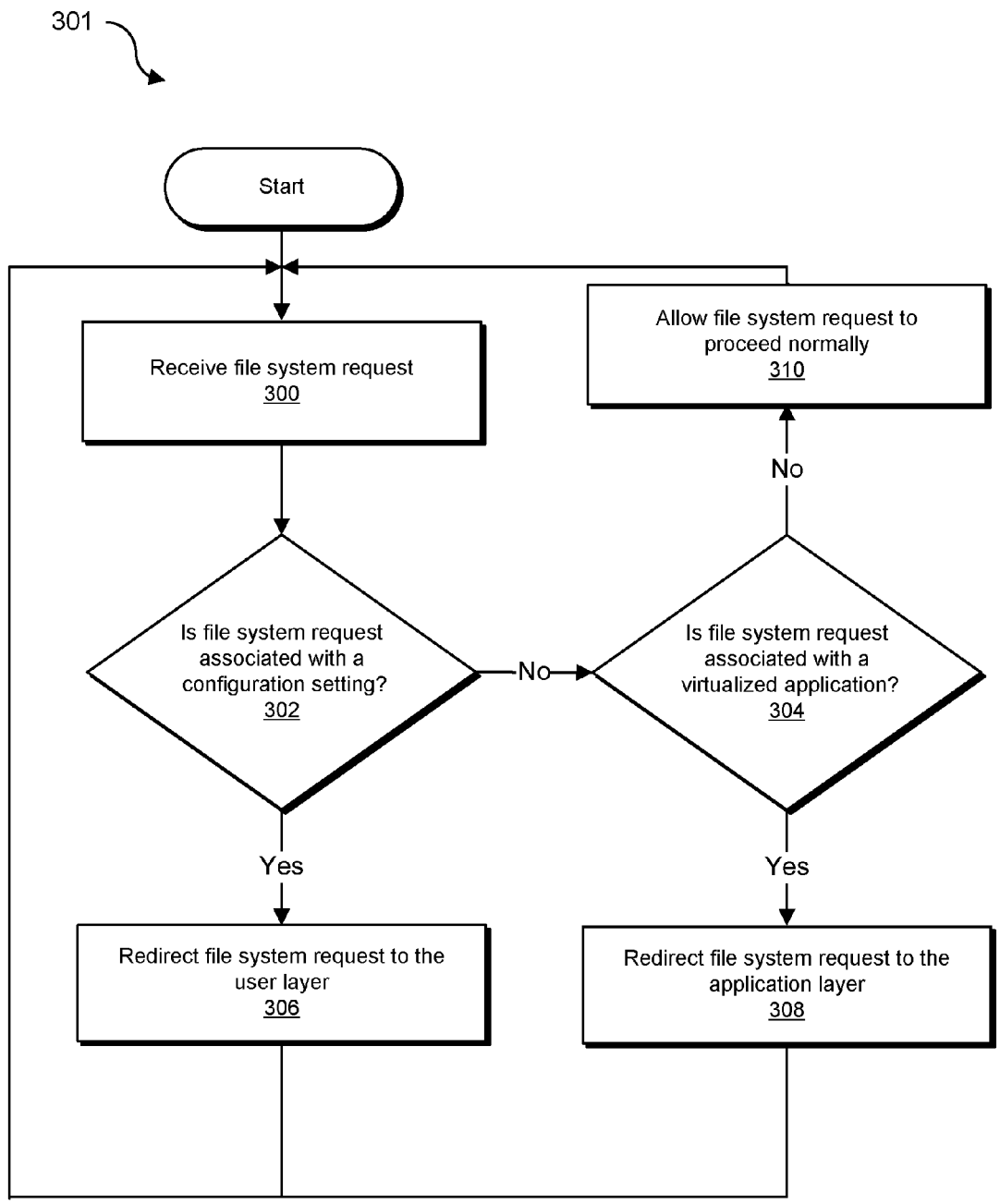
FIG. 9 is a flow diagram of an exemplary computer-implemented method of filtering and redirecting file system requests for the system shown in FIG. 8.

Referring to FIG. 9, a flow diagram is shown of an exemplary computer-implemented method 301 for determining whether a file system request should be redirected. This method may be especially applicable to the virtualization driver 122 shown in FIG. 7. This method may also be especially applicable to the layer configuration shown in FIG. 8 where the configuration settings are included in the user layer 150 and not in any of the application layers 250, 260, 270.

The method 301 begins at step 300 when the virtualization driver 122 receives a file system request. At step 302, the virtualization driver 122 determines whether the file system request is associated with a configuration setting (e.g., an operating system configuration setting, an application configuration setting, or the like). If the file system request is associated with a configuration setting, it is redirected to the user layer 150 at step 306.

If the file system request is not associated with a configuration setting, the virtualization driver 122 may then determines whether the file system request is associated with a virtualized application at step 304. If the answer is yes, then the file system request may be redirected to the application layer at step 308. If the answer is no, then at step 310, the file system request may be allowed to proceed to the file system 124.

Figure 10:
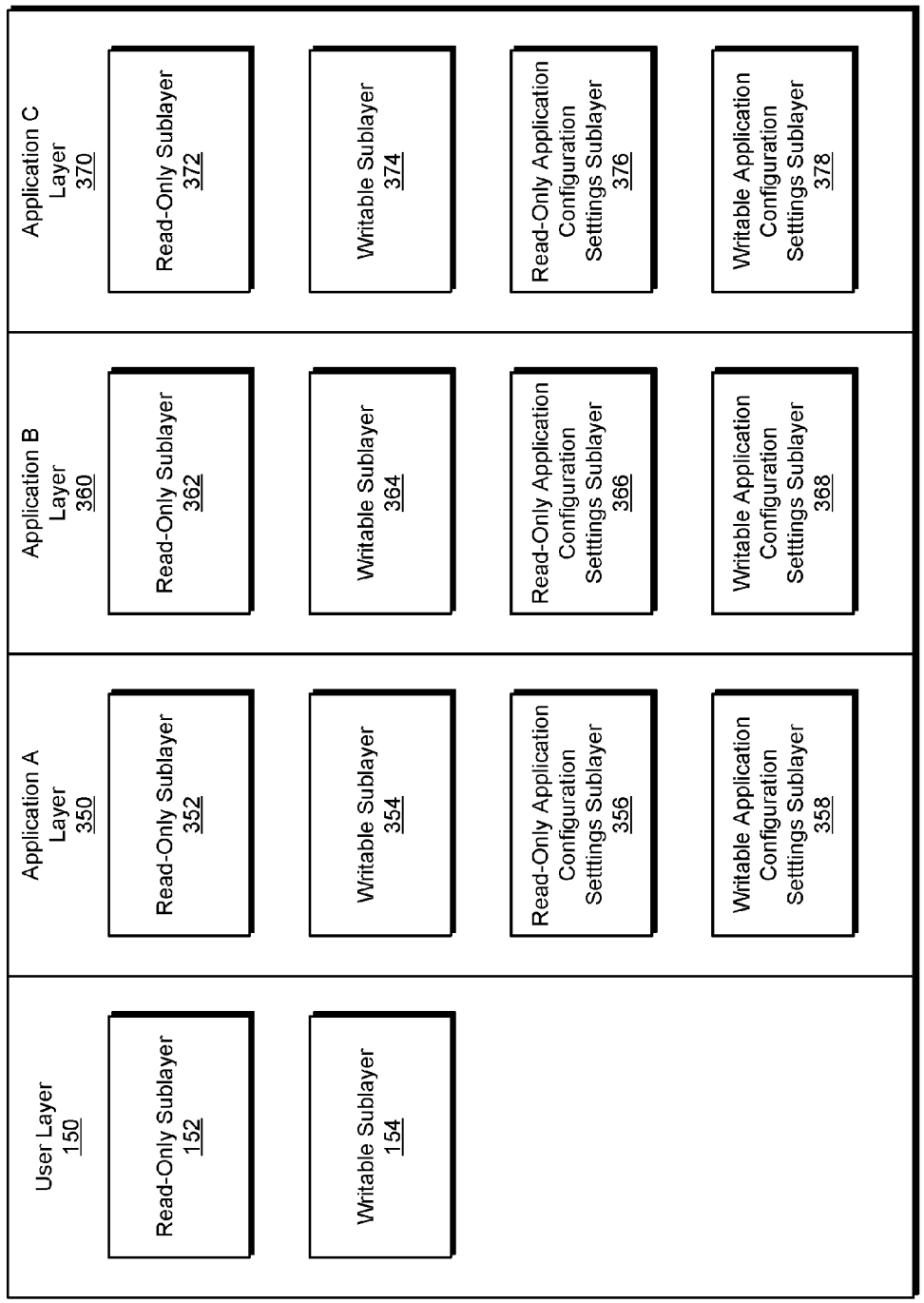
FIG. 10 is a block diagram of an exemplary system that includes a user layer and three application layers. The application layers include read-only and writable sublayers for those configuration settings that are used by the virtualized application.

Another embodiment of a system is shown in FIG. 10. This embodiment is a counterpart to the system shown in FIG. 7. The layers shown in FIG. 10 may be similar to those shown in FIG. 8 except that each application layer 350, 360, 370 may include a read-only application configuration settings sublayer 356, 366, 376 and a writable application configuration settings sublayer 358, 368, 378. These sublayers may be configured similarly to the other sublayers described herein (e.g., they can be reset, etc.). However, these sublayers may include the configuration settings for each virtualized application. Thus, the configuration settings of any virtualized application can be reset back to the read-only values. Also, because the application configuration settings sublayers are separate from the other read-only sublayers 352, 362, 372 and writable sublayers 354, 364, 374, resetting the configuration settings may not reset the entire application. The user layer 150 may be configured to include configuration settings from the operating system and other sources, such as non-virtualized applications.

Figure 11:
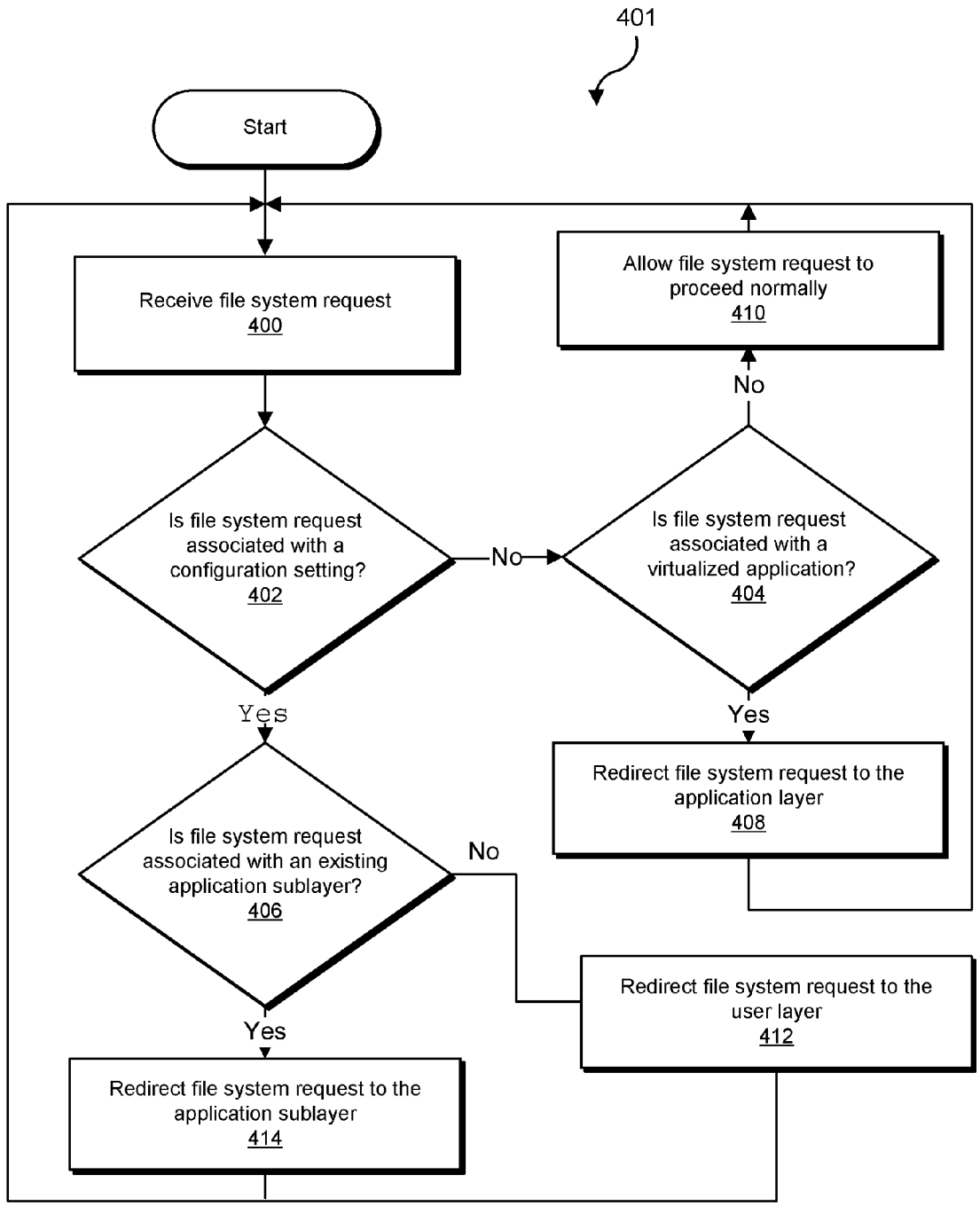
FIG. 11 is a flow diagram of an exemplary computer-implemented method of filtering and redirecting file system requests for the system shown in FIG. 10.
Figure 12:
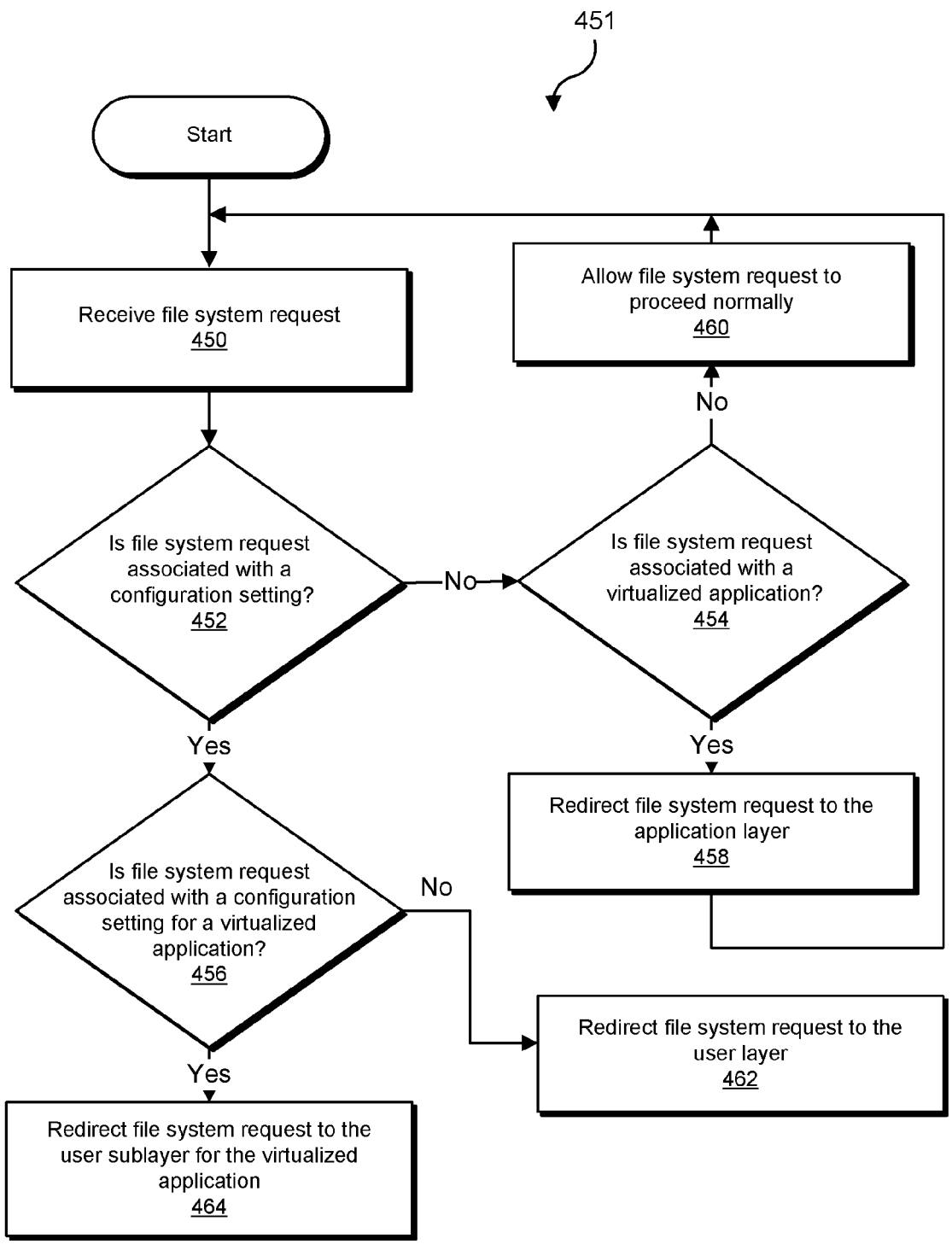
FIG. 12 is a flow diagram of another exemplary computer-implemented method of filtering and redirecting file system requests for the system shown in FIG. 10.

FIGS. 11 and 12 show flow charts of different embodiments of exemplary computer-implemented methods that may be used by the virtualization driver 122 to redirect file system requests to the appropriate virtual package. The embodiment shown in FIG. 11 may be intended to be used in situations where some virtualized applications have an application configuration settings sublayer and other virtualized applications do not.

Steps 400, 402, 404, 408, 410 are largely the same as the corresponding steps in the method shown in FIG. 9. Accordingly, a description of these steps 400, 402, 404, 408, 410 is not repeated here. However, unlike the method shown in FIG. 9, if the file system request is associated with a configuration setting at step 402, then the next step 406 may be to determine whether the file system request is associated with an already existing application sublayer. If the answer is yes, then the file system may be redirected to the application sublayer (i.e., application configuration settings sublayer) at step 414. If the answer is no, then the file system request may be redirected to the user layer 150 at step 412.

The method shown in FIG. 12 may be used when the system shown in FIG. 10 is configured so that the user layer 150 does not include any of the application configuration settings. Once again, steps 450, 452, 454, 458, 460 may be the same as those steps already described in connection with FIG. 9. However, if the file system request is associated with a configuration setting at step 452, then the next step 456 may be to determine whether the file system request is associated with a configuration setting for a virtualized application. If the answer is yes, then the file system request may be redirected to the user sublayer for the virtualized application at step 464 (i.e., the application configuration settings sublayers). If the answer is no, then the file system request may be redirected to the user layer at step 462.

Unlike the method depicted in FIG. 11, it was unnecessary to determine whether an application configuration settings sublayer existed, since it is given that if the application is virtualized it has an application configuration settings sublayer.

Figure 13:
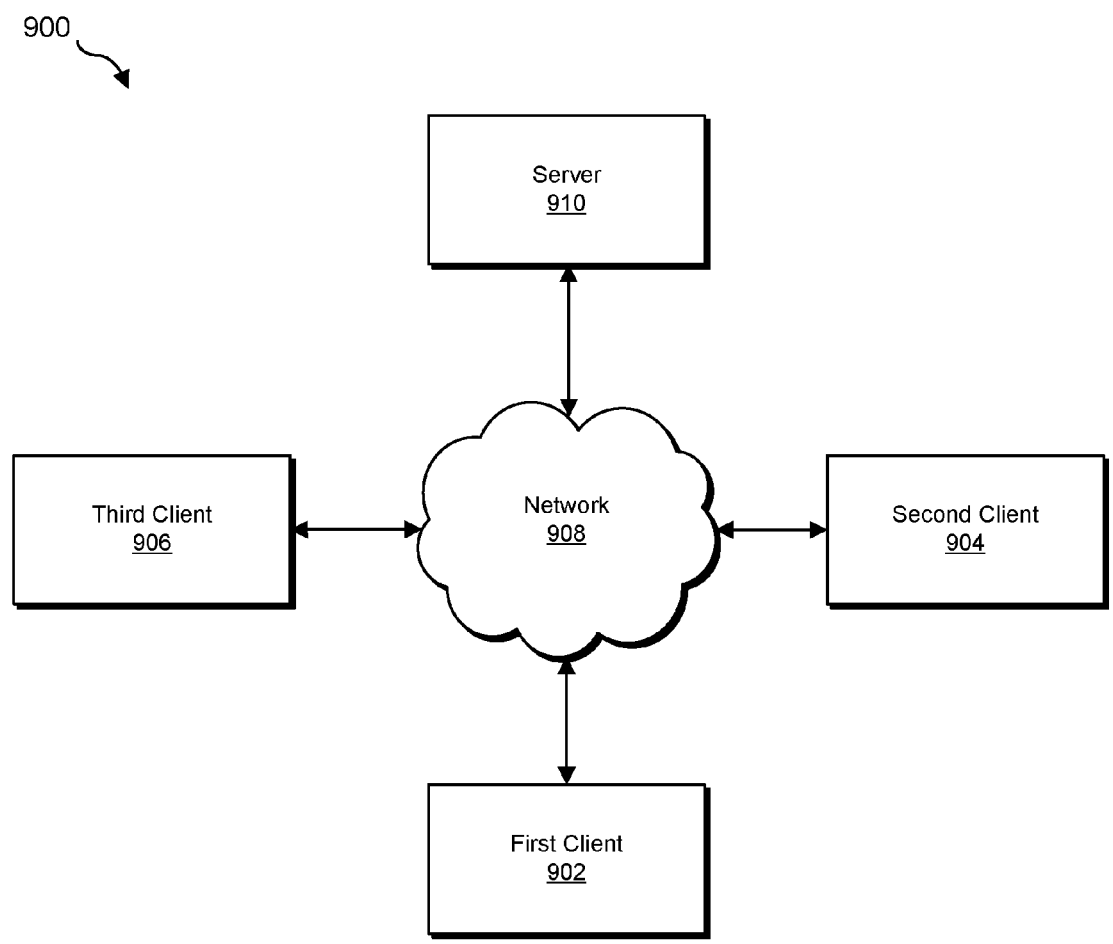
FIG. 13 is a block diagram of an exemplary network-based system for implementing a roaming configuration settings profile over a network.

FIG. 13 is an illustration of an exemplary network-based system 900 for managing configuration settings. As illustrated in this figure, exemplary system 900 may comprise a client 902 in communication with a server 910 via a network 908.

Client 902 generally represents any type or form of client-side computing device, such as a user's computing device, capable of executing computer-readable instructions. In certain embodiments, client 902 may comprise one or more portions of exemplary system 100 in FIG. 1. For example, one or more of modules 102 in FIG. 1 may be stored and configured to run on client 902.

In at least one embodiment, client 902 may communicate with server 910 via network 908. Network 908 generally represents any type or form of communication or computing network; including, for example, an intranet, a wide area network (WAN), a local area network (LAN), a personal area network (PAN), or the Internet.

The server 910 generally represents any type or form of server-side computing device, such as a backend. In certain embodiments, server 910 may comprise one or more portions of exemplary system 100 in FIG. 1. For example, one or more of modules 102 from FIG. 1 may be stored and configured to run on server 910. Similarly, server 910 may comprise a configuration settings repository. The configuration settings repository may be a settings engine and database or it may be a collection of application-settings lists and a collection of user-application settings export files. In addition, the configuration settings repository may include application maps that can be used to convert settings from one application to another, especially between different versions of an application.

Figure 14:
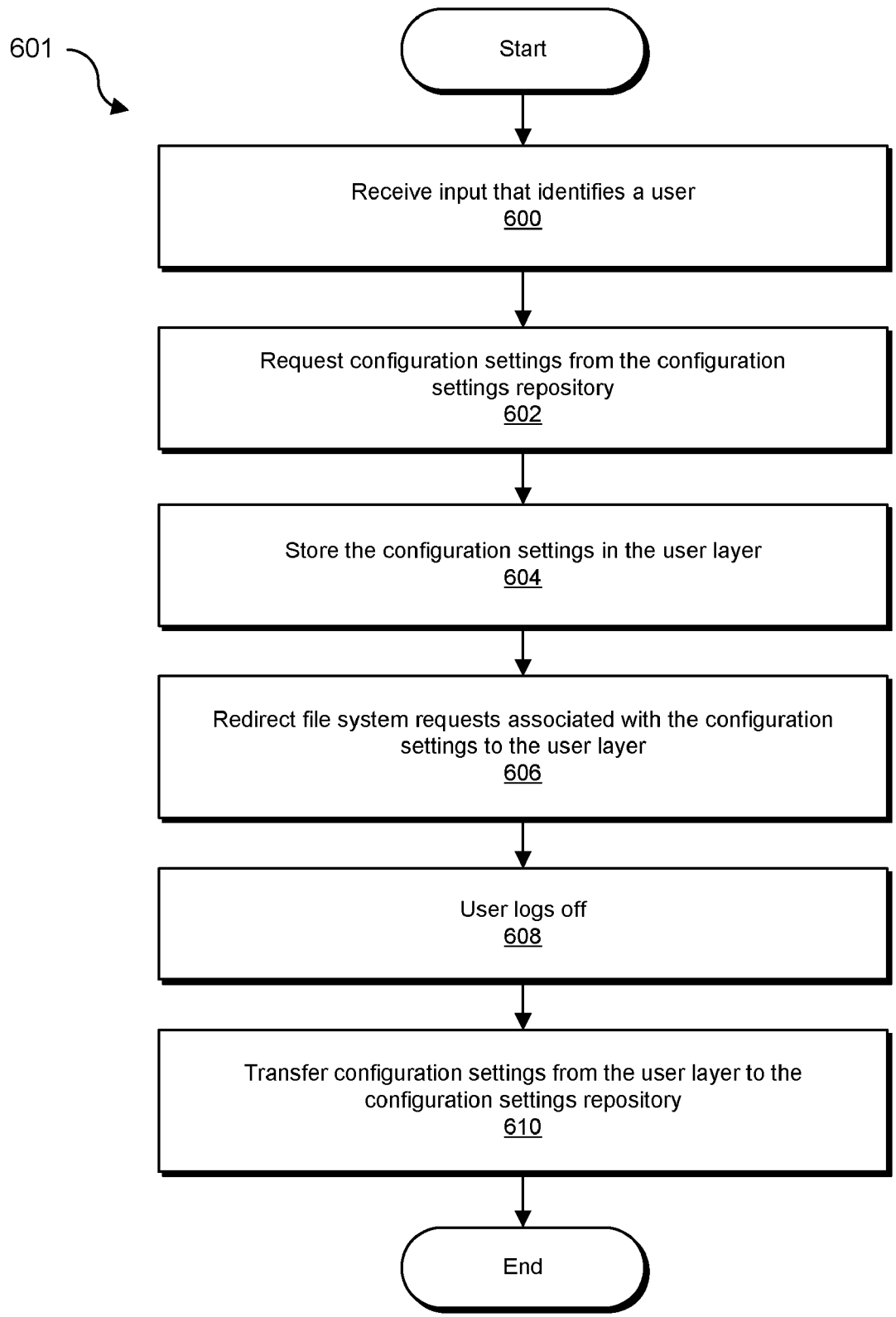
FIG. 14 is a flow diagram of an exemplary computer-implemented method of distributing the user's configuration settings over a network.

FIG. 14 is a block diagram of one embodiment of a computer-implemented method 601 for sending a user's configuration settings to a client computer 902, 904, 906 over a network 908. At step 600, the client computer may receive input from a user that identifies the user. The input may be in the form of a username and password provided when the user logs on. In other embodiments, the input may have any of a number of other forms so long as it is capable of identifying the user.

The identifying information may be used by the client computer to access the user layer for the particular user. If the user does not have a user layer, one may be created. At step 602, the client computer may request the user's configuration settings from the configuration settings repository, which is located on the server 910. In one embodiment, the virtualization application maintains a list of the applications that are installed or activated on the client computer. The client computer may be configured to only request configuration settings for those applications that are listed as being on the client computer.

At step 604, the client computer may receive and store the user's configuration settings. In one embodiment, the client computer may receive the user's configuration settings as a virtual configuration settings package in the format of an exportable file. The client computer may load the exportable file and populates the user layer.

Once the configuration settings have been loaded into the user layer, the virtualization application may monitor file system requests for those that are related to the user's configuration settings. File system requests that are related to the user's configuration settings may be redirected to the virtual configuration settings package.

At step 608, the user may log off the computer system and at step 610, the user's configuration settings may be transferred from the user layer to the configuration settings repository. In one embodiment, this may include exporting the user layer to the server. Local changes to the user layer may be addressed in any of a number of ways. For example, in one embodiment, the local changes may be preserved and transferred back to the configuration settings repository. In another embodiment, one or more properties may indicate whether local changes are sent back to the configuration settings repository or ignored, whether repository changes are accepted locally, ignored, ignored if changed locally, made after a system event (such as a system reboot), made immediately, or ignored if local changes have been made.

In one embodiment, resetting the user layer may cause it to revert back to the values found in the configuration settings repository. Deleting, exporting, and importing the user layer can be done in a similar manner as the user layer 150. One difference is that exporting the user layer may be done by writing user layer data to the repository instead of creating the exportable file.

Figure 15:
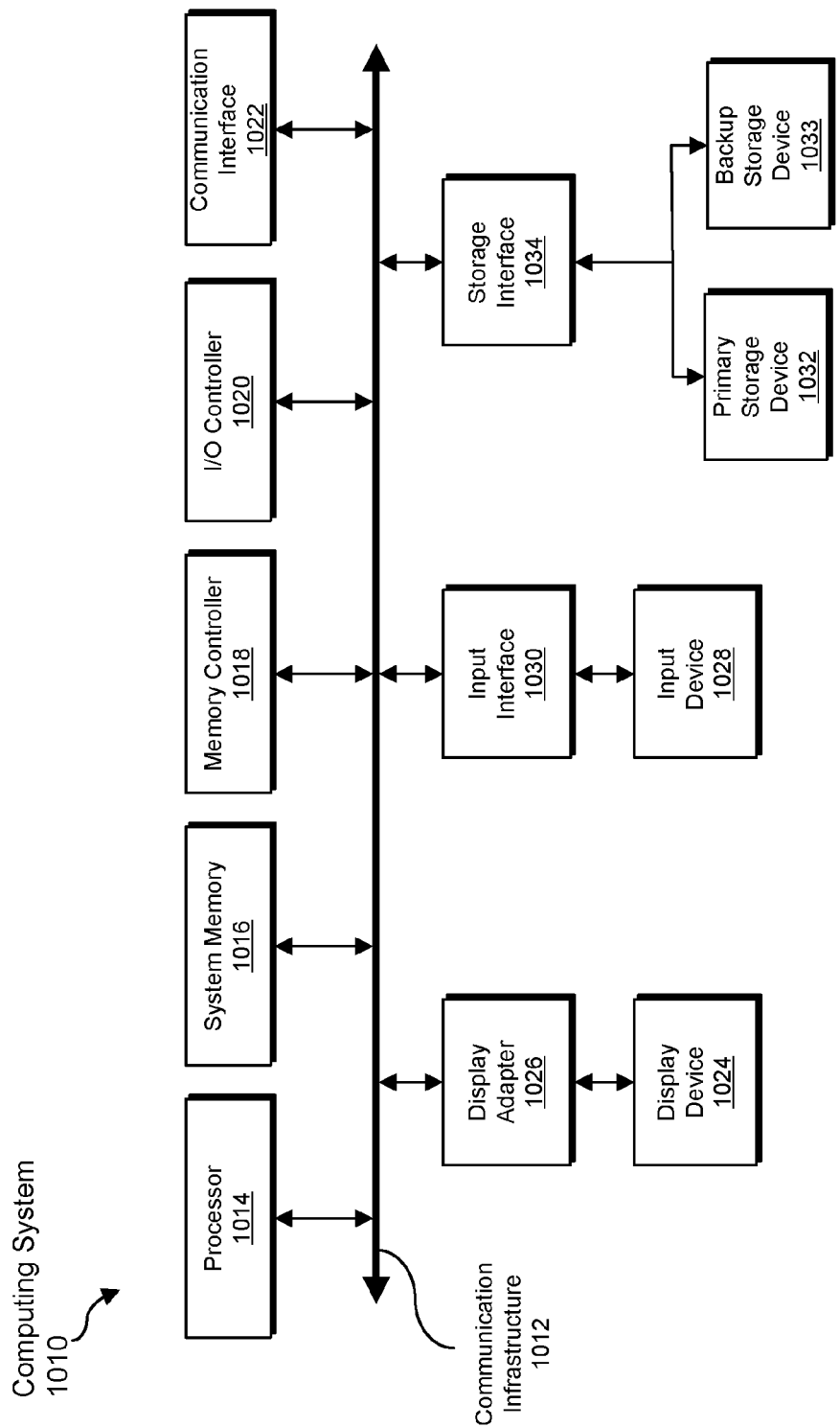
FIG. 15 is a block diagram of an exemplary computing system capable of implementing one or more of the embodiments described and/or illustrated herein.

FIG. 15 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may comprise at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the detecting, performing, allowing, comparing, creating, identifying, transmitting, calculating, normalizing, determining, receiving, displaying, prompting, and preventing steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may comprise both a volatile memory unit (such as, for example, system memory 1016) and a non-volatile storage device (such as, for example, primary storage device 1032, as described in detail below).

In certain embodiments, exemplary computing system 1010 may also comprise one or more components or elements in addition to processor 1014 and system memory 1016. For example, as illustrated in FIG. 15, computing system 1010 may comprise a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller may perform and/or be a means for performing, either alone or in combination with other elements, one or more of the steps or features described and/or illustrated herein, such as detecting, performing, allowing, comparing, creating, identifying, transmitting, calculating, normalizing, determining, receiving, displaying, prompting, and preventing.

I/O controller 1020 generally represents any type or form of module capable of coordinating and/or controlling the input and output functions of a computing device. For example, in certain embodiments I/O controller may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the detecting, performing, allowing, comparing, creating, identifying, transmitting, calculating, normalizing, determining, receiving, displaying, prompting, and preventing steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network comprising additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the detecting, performing, allowing, comparing, creating, identifying, transmitting, calculating, determining, receiving, displaying, prompting, and preventing steps disclosed herein. Communication interface 1022 may also be used to perform and/or be a means for performing other steps and features set forth in the instant disclosure.

As illustrated in FIG. 15, computing system 1010 may also comprise at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 15, exemplary computing system 1010 may also comprise at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the detecting, performing, allowing, comparing, creating, identifying, transmitting, calculating, determining, receiving, displaying, prompting, and preventing steps disclosed herein. Input device 1028 may also be used to perform and/or be a means for performing other steps and features set forth in the instant disclosure.

As illustrated in FIG. 15, exemplary computing system 1010 may also comprise a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also comprise other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, the exemplary file systems disclosed herein may be stored on primary storage device 1032, while the exemplary file-system backups disclosed herein may be stored on backup storage device 1033. Storage devices 1032 and 1033 may also be used, for example, to perform and/or be a means for performing, either alone or in combination with other elements, one or more of the detecting, performing, allowing, comparing, creating, identifying, transmitting, calculating, normalizing, determining, receiving, displaying, prompting, and preventing steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 15 need not be present to practice the embodiments descried and/or illustrated herein. The devices and subsystems referenced above may also be interconnected in different ways from that shown in FIG. 15. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 16:
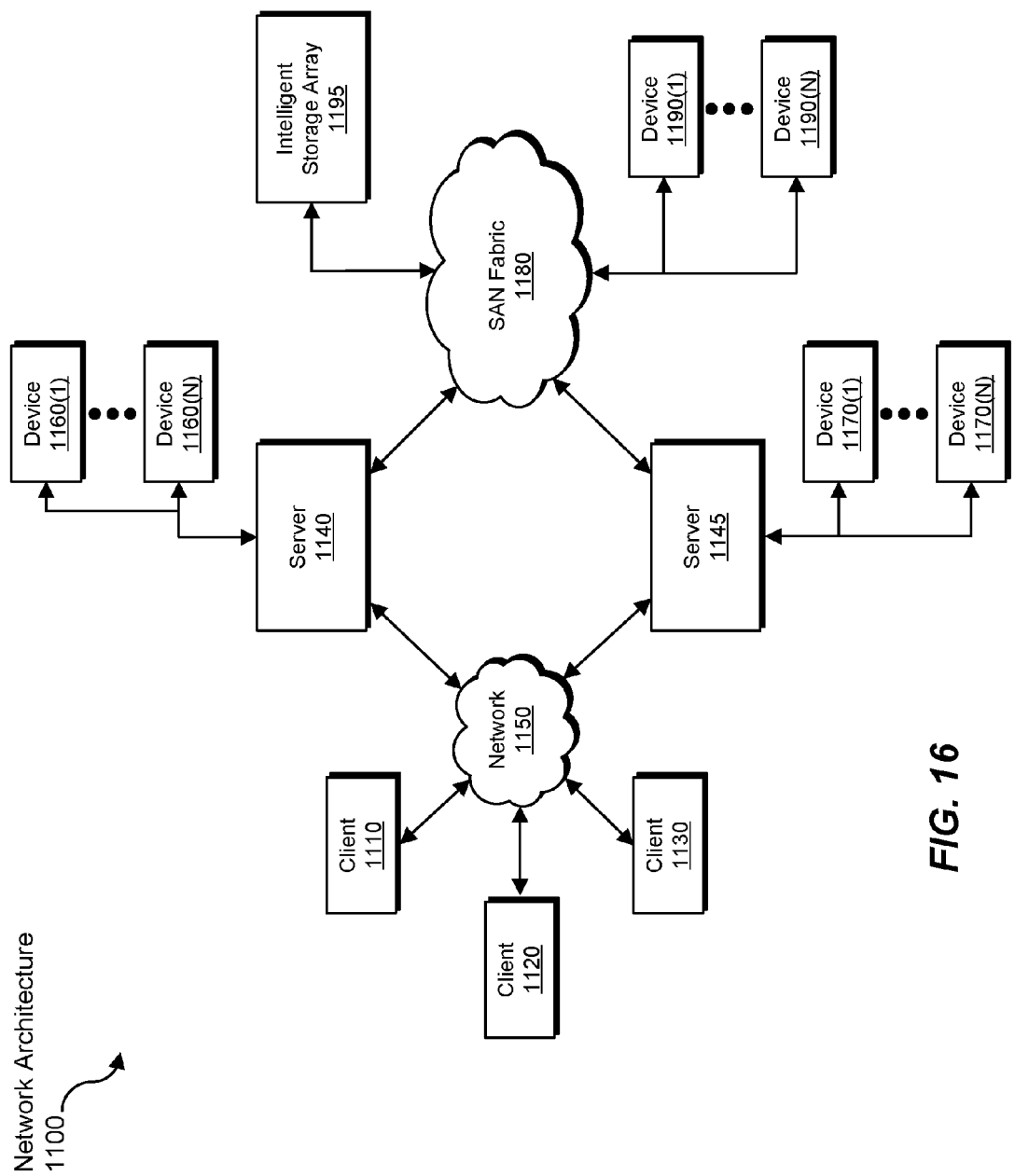
FIG. 16 is a block diagram of an exemplary computing network capable of implementing one or more of the embodiments described and/or illustrated herein.

FIG. 16 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 15. Similarly, servers 1140 and 1145 generally represent computing devices or systems, such as application servers or database servers, configured to provide various database services and/or to run certain software applications. Network 1150 generally represents any telecommunication or computer network; including, for example, an intranet, a wide area network (WAN), a local area network (LAN), a personal area network (PAN), or the Internet.

As illustrated in FIG. 16, one or more storage devices 1160(1)-(N) may be directly attached to server 1140. Similarly, one or more storage devices 1190(1)-(N) may be directly attached to server 1145. Storage devices 1160(1)-(N) and storage devices 1190(1)-(N) generally represent any type or form of storage device or medium capable of storing data and/or other computer-readable instructions. In certain embodiments, storage devices 1160(1)-(N) and storage devices 1190(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 15, a communication interface, such as communication interface 1022 in FIG. 15, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 16 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the detecting, performing, allowing, comparing, creating, identifying, transmitting, calculating, normalizing, determining, receiving, displaying, prompting, and preventing steps disclosed herein. Network architecture 1100 may also be used to perform and/or be a means for performing other steps and features set forth in the instant disclosure.

As detailed above, computing system 1010 and/or one or more of the components of network architecture 1100 may perform and/or be a means for performing, either alone or in combination with other elements, one or more steps of the exemplary methods described and/or illustrated herein. For example, one computer-implemented method of capturing configuration settings comprises monitoring file system requests to identify those file system requests that are associated with configuration settings and redirecting the file system requests that are associated with configuration settings to a user layer that is dedicated to storing a user's configuration settings.

In certain embodiments, monitoring file system requests includes monitoring at least one file and at least one registry entry where the configuration settings are stored. Also, redirecting the file system requests includes redirecting file read/write requests and registry read/write requests to the user layer. The configuration settings may include operating system configuration settings and/or application configuration settings. Moreover, the configuration settings may include files and registry entries.

In certain additional embodiments, the method may also comprise monitoring file system requests to identify those file system requests that are associated with an application and redirecting the file system requests that are associated with the application to an application layer. The method may further comprise redirecting file system requests that are associated with configuration settings for the application to the user layer. The application layer may include a user sublayer that is dedicated to storing the user's configuration settings for the application.

In another embodiment, a computer-implemented method of applying configuration settings to a computer system comprises receiving input that identifies a user, requesting the configuration settings for the user from a configuration settings repository, receiving the configuration settings for the user from the configuration settings repository, and storing the configuration settings for the user in a user layer that is dedicated to storing the configuration settings of the user.

In certain embodiments, the method may comprise redirecting file system requests associated with the configuration settings to the user layer. The method may also comprise transferring the configuration settings to the configuration settings repository when the user logs off the computer system. The user layer may interface with an operating system on the computer system through a virtualization driver. The computer system may include a virtualized application located in an application layer, and wherein the configuration settings include configuration settings for the virtualized application. The configuration settings may include operating system configuration settings and/or application configuration settings. The configuration settings repository may be located on a server.

Computing system 1010 and/or one or more of the components of network architecture 1100 may also include a computer-readable medium comprising one or more computer-executable instructions that, when executed by a computing device, cause the computing device to create a user layer that is dedicated to storing the configuration settings of a user and redirect file system requests to the user layer.

In certain embodiments, the one or more computer-executable instructions that, when executed by a computing device, cause the computing device to create a plurality of user layers each of which is dedicated to storing the configuration settings of a user and redirect file system requests to the plurality of user layers. The one or more computer-executable instructions, when executed by a computing device, may also cause the computing device to selectively activate and deactivate the user layer. The one or more computer-executable instructions, when executed by a computing device, may cause the computing device to reset the user layer to a previous state. The one or more computer-executable instructions, when executed by a computing device, may also cause the computing device to export the user layer to a file where the configuration settings have been variablized to allow the configuration settings to be imported onto operating systems that have a different folder structure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for capturing configuration settings, at least a portion of the method being performed by a computing system comprising at least one processor, the method comprising:
   identifying a user that is logged onto a computing device;
   identifying configuration settings that are specific to the user logged onto the computing device;
   providing a user layer that virtualizes the user's configuration settings such that the user's configuration settings are applied to the computing device when the user logs onto the computing device;
   monitoring file system requests to identify those file system requests that are associated with configuration settings; and
   redirecting the file system requests that are associated with configuration settings to the user layer that virtualizes the user's configuration settings.

2. The method of claim 1, wherein monitoring file system requests includes monitoring at least one file and at least one registry entry where the configuration settings are stored.

3. The method of claim 1, wherein redirecting the file system requests includes redirecting file read/write requests and registry read/write requests to the user layer.

4. The method of claim 1, further comprising:
   monitoring file system requests to identify file system requests that are associated with an application; and
   redirecting the file system requests that are associated with the application to an application layer.

5. The method of claim 4, comprising redirecting file system requests that are associated with configuration settings for the application to the user layer.

6. The method of claim 4, wherein the application layer includes a user sublayer that is dedicated to storing the user's configuration settings for the application.

7. The method of claim 1, wherein the configuration settings include operating system configuration settings and/or application configuration settings.

8. The method of claim 1, wherein the configuration settings include files and registry entries.

9. A computer-implemented method for applying configuration settings to a computer system, at least a portion of the method being performed by a computing system comprising at least one processor, the method comprising:
   receiving input that identifies a user that has logged onto a computing device;
   requesting configuration settings that are specific to the user from a configuration settings repository;
   receiving the user's configuration settings from the configuration settings repository;
   storing the user's configuration settings in a user layer that applies the user's configuration settings to the computing device when the user is logged onto the computing device.

10. The method of claim 9, further comprising redirecting file system requests associated with the configuration settings to the user layer.

11. The method of claim 9, further comprising transferring the configuration settings to the configuration settings repository when the user logs off the computer system.

12. The method of claim 9, wherein the user layer interfaces with an operating system on the computer system through a virtualization driver.

13. The method of claim 9, wherein the computer system includes a virtualized application located in an application layer, and wherein the configuration settings include configuration settings for the virtualized application.

14. The method of claim 9, wherein the configuration settings include at least one of operating system configuration settings and application configuration settings.

15. The method of claim 9, wherein the configuration settings repository is located on a server.

16. A non-transitory computer-readable medium comprising one or more computer-executable instructions that, when executed by a computing system, cause the computing system to:
   identify a user that is logged onto a computing device;
   identify configuration settings that are specific to the user logged onto the computing device;

create a user layer that virtualizes the user's configuration settings such that the user's configuration settings are applied to the computing device when the user logs onto the computing device;

redirect file system requests that are associated with configuration settings to the user layer that virtualizes the user's configuration settings.

17. The non-transitory computer-readable medium of claim 16, wherein the one or more computer-executable instructions, when executed by the computing, further cause the computing system to:

create a plurality of user layers that each virtualizes configuration settings specific to a particular user;

redirect file system requests that are associated with configuration settings to the user layer that virtualizes the configuration settings specific to the particular user logged onto the computing device.

18. The non-transitory computer-readable medium of claim 16, wherein the one or more computer-executable instructions, when executed by the computing system, further cause the computing system to selectively activate and deactivate the user layer.

19. The non-transitory computer-readable medium of claim 16, wherein the one or more computer-executable instructions, when executed by the computing system, further cause the computing system to reset the user layer to a previous state.

20. The non-transitory computer-readable medium of claim 16, wherein the one or more computer-executable instructions, when executed by the computing system, further cause the computing system to export the user layer to a file where the configuration settings have been variablized to allow the configuration settings to be imported onto operating systems that have a different folder structure.

* * * * *